July 18, 1944.  G. E. STANLEY  2,353,793
PLATE CLUTCH
Filed June 26, 1942  2 Sheets-Sheet 2

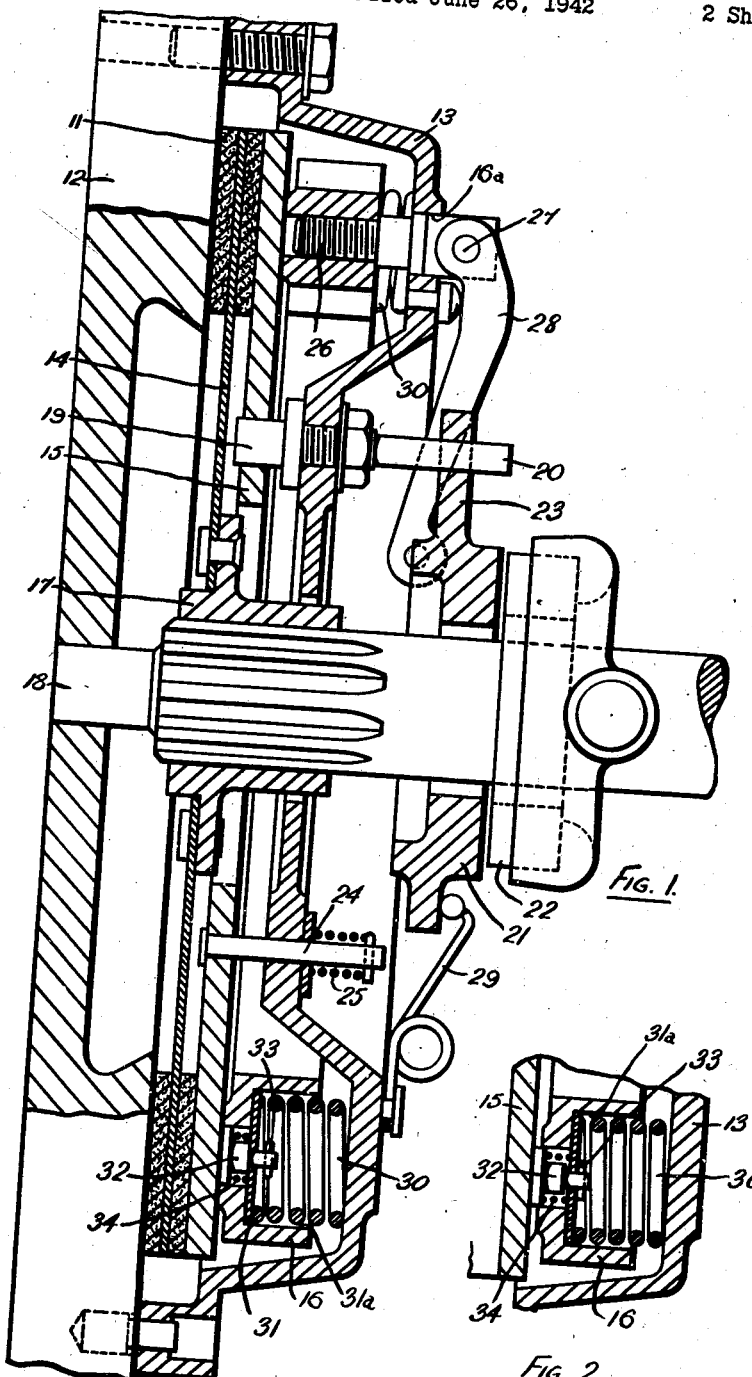

INVENTOR:
GEORGE E. STANLEY
by Mawhinney & Mawhinney
attys.

Patented July 18, 1944

2,353,793

UNITED STATES PATENT OFFICE 2,353,793

PLATE CLUTCH

George Enoch Stanley, Beddgelert, England

Application June 26, 1942, Serial No. 448,621
In Great Britain July 4, 1941

8 Claims. (Cl. 192—68)

This invention relates to plate clutches, of the kind in which the clutch is engaged by a driven disc being clamped against a face of a driving member by means of a presser-plate having a sliding and driving or equivalent connection with the driving member.

My main object is to provide a very inexpensive form of plate clutch, having few parts which will be easy to assemble, and one which will give very gradual and sweet engagement for a low torque.

According to the main feature of the invention, the presser-plate, which may be lightly biassed in a disengaging direction, is engaged firstly through a light spring means and thereafter through the main engaging spring means, whilst during withdrawal the pressure of the main engaging spring means is first removed from the presser-plate, and then that of the light spring means—no disengaging force being directly applied to the presser-plate unless, as stated, it be lightly biassed in the disengaging direction.

According to a further feature of the invention, the presser-plate is lightly biassed in the engaging direction by means of spring-pressed plungers (this bias being, however, a heavier one than any bias acting on the presser-plate in the disengaging direction) and is mainly biassed in the engaging direction by a withdrawal presser-ring. This latter is withdrawable for releasing the clutch, and when withdrawn a predetermined amount it acts on the plungers to remove them from engagement with the presser-plate, thus leaving the latter free, or to respond to the disengaging bias if there is one. The presser-ring is preferably of aluminium, to assist in dissipating heat from the presser-plate.

In the accompanying sheets of drawings:

Figure 1 is a composite sectional elevation through one form of clutch according to the invention, the section being mainly on the lines A B C D and E of Figure 3;

Figure 2 is a similar but fragmentary view on the line B of Figure 3 showing the clutch in course of being engaged or disengaged;

Figure 3:
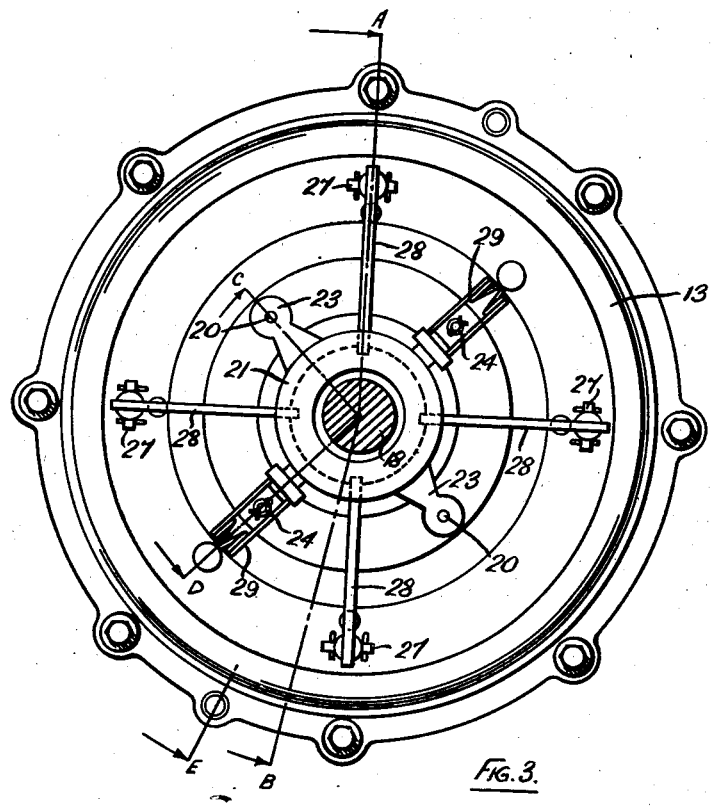
Figure 3 is an axial elevation of the clutch, taken from the right of Figure 1.
Figure 4:
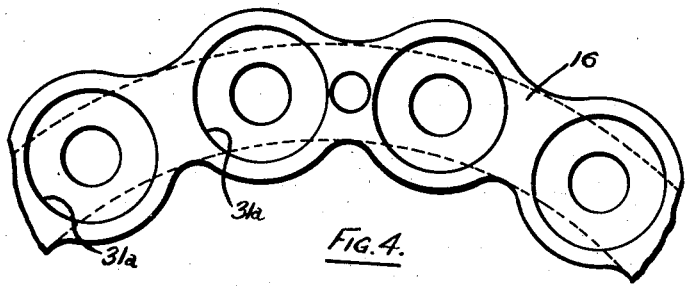
Figure 4 is a fragmentary axial elevation of the presser-ring.

In the construction shown, which is of a plate clutch for a motor-vehicle, the driving face 11 is provided by the fly-wheel 12 in the ordinary way, and bolted to the latter is an aluminium or like casing 13 enclosing the driven disc 14, the presser-plate 15, and a withdrawal presser-ring 16. The driven disc 14 has a hub 17 slidably supported from splines on the driven clutch shaft 18 in known manner, and the presser-plate is slidingly supported, near its inner periphery, from pins 19 which are fast in the driving casing 13. The ends 20 of the pins 19 on the side of the casing 13 remote from the presser-plate 15 slidably support a cast-iron or like withdrawal ring 21 with which coacts a graphite ring 22. In the present instance the pin ends 20 slidingly engage arms 23 fast with the withdrawal ring 21.

Angularly spaced from the pins 19 are other pins 24 fast with the presser-plate 15 and slidably extending through the driving casing 13, the latter pins 24 carrying on their remote ends small compression springs 25 which serve for lightly biassing the presser-plate 15 in a disengaging direction—i. e., to the right in Figure 1. Figure 3 shows two diametrically-opposite pins 19, 20, and, along a diameter at right-angles thereto, a pair of pins 24.

Against the face of the presser-plate 15 remote from the driven disc 14 is disposed the withdrawal presser-ring 16. This carries, for example, at four places, axially-disposed pins 26 slidably extending through openings in the driving casing 13 and pivotally connected at 27 to withdrawal levers 28 coacting with the withdrawal ring 21. The pins 26 may have screw-threaded ends screwed into corresponding tapped bores in the presser-ring 16 as shown, and they serve for the support of the presser-ring 16. Springs 29 lightly bias the withdrawal ring 21 (to the left in Figure 1) to load the levers 28 and prevent rattle.

In the present instance I use sixteen main clutch-engaging springs 30 disposed to act between the presser-ring 16 and the driving casing 13. These are helical springs angularly spaced from one another. Actually, instead of acting directly on the presser-ring 16 they act on washers 31 disposed in appropriate recesses 31a in the presser-ring. If the presser-ring 16 is slightly flexible, use should be made of more withdrawal pins 26 and levers 28 than four.

In each of the washers 31 there is slidably supported a plunger 32 formed with a head adjacent the presser-plate 15, the other ends of the plungers carrying split pins 33 by which they are retained in the washers 31. Light coil springs 34 act between the heads of the plungers 32 and the washers 31.

When the presesr-ring 16 is pulled out (to the right in Figure 1) under the operation of the withdrawal levers 28 the pressure of the main clutch springs 30 is removed from the presser-plate 15, but the light pressure of the spring-pressed plungers 32 is still applied to the presser-plate (as shown by Figure 2) until the washers 31 engage the split pins 33 on the plungers. Thereafter the plungers will be moved by the presser-ring 16 out of engagement with the presser-plate 15, thus effecting the full release of the clutch.

Conversely, when engaging the clutch, the presser-plate 15 is first engaged through the pressure of the spring-pressed plungers 32 (as shown by Figure 2), thus providing a very gradual and sweet take-up at low torques, and thereafter the main clamping pressure is applied to the presser-plate through the springs 30 acting on the presser-ring 16.

What I claim as my invention and desire to secure by Letters Patent of the United States is:

1. A plate clutch having a driving member, a presser-plate in driving connection with the driving member, a driven disc to be clamped between the driving member and presser-plate when the clutch is engaged, a presser-ring for urging the presser-plate in the engaging direction, and two sets of spring means for holding the clutch engaged, said sets of spring means including a light-acting means interposed between and bearing oppositely upon the presser-ring and the presser-plate when the clutch is initially being engaged and a heavier-acting means operative directly upon the presser-ring to urge it toward the presser-plate.

2. A plate clutch including a driving member, a driven disc, a presser-plate for clamping the driven disc against the driving member, a set of main springs urging the presser-plate toward its engaging position for holding the clutch engaged, a set of minor springs interposed between the main springs and the presser-plate for effecting the preliminary engagement of the clutch, and means, during the release of the clutch, for first removing the pressure of the main set of springs from the presser-plate and for subsequently removing the pressure of the set of minor springs from the presser-plate.

3. In a plate clutch, a presser-plate, a presser-ring, main springs urging the presser-ring into contact with the presser-plate to engage the clutch, said main springs acting against washers disposed at the bottoms of recesses in the presser-ring, and withdrawal means, for releasing the clutch, acting on the presser-ring, some at least of the washers carrying plungers mounted for limited axial movement and spring pressed to engage the presser-plate.

4. In a plate clutch, a presser-ring having a circle of recesses on one face, washers disposed at the bottoms of the recesses, plungers slidably disposed in the washers, the plungers having heads on the sides of the washers remote from the recesses, light springs acting between the heads of the plungers and the washers, and means for preventing the plungers from being withdrawn from the washers.

5. In a plate clutch including a presser-plate, a presser-ring movable toward and away from the presser-plate, a main-engaging spring means acting upon one face of the presser-ring to urge it into contact with the presser-plate, plungers mounted in the presser-ring for limited axial movement beyond its face into contact with the presser plate, and light springs biassing the plungers to extend from the face of the presser-ring.

6. In a plate clutch, a presser-plate, a presser-ring movable from a position spaced from the presser-plate to contact with it and move it in the engaging direction, main engaging springs acting upon the face of the presser-ring remote from the presser-plate, plungers mounted in the presser-ring and axially extensible from it into contact with the presser-plate, and light springs biassing the plungers to extend from the face of the presser-ring.

7. In a plate clutch, a presser-plate, a presser-ring movable from a position spaced from the presser-plate to contact with it and move it in the engaging direction, main engaging springs acting upon the face of the presser-ring remote from the presser-plate, plungers mounted in the presser-ring and axially extensible from it into contact with the presser-plate, light springs biassing the plungers to extend from the face of the presser-ring, and withdrawal means acting upon the presser-ring.

8. In a plate clutch that includes a movable presser-plate, an operating member movable from spaced relation to contact with the presser-plate for shifting the latter to its engaging position, main spring means urging the operating member toward the presser-plate, and disengaging means for moving the operating member out of contact with the presser-plate against the pressure of the main spring means; auxiliary pick up clutching means for gently starting the load of the driven element of the clutch, the said means comprising auxiliary presser-plate-moving means mounted on the operating member and extensible therefrom toward and into contact with the presser-plate while the operating member is spaced from it, and spring means bearing oppositely upon the operating member and the auxiliary plate-moving means, the said spring means being of less power than the main spring means, and the auxiliary plate-moving means being withdrawn from contact with the presser-plate by the disengaging movement of the operating member subsequent to withdrawal of the said member from contact with the presser-plate.

GEORGE ENOCH STANLEY.